United States Patent Office 3,092,453
Patented June 4, 1963

3,092,453
PRODUCTION OF LOW-SODA ALUMINA
Walter H. Gitzen, Belleville, Ill., assignor to Aluminum Company of America, Pittsburgh, Pa., a corporation of Pennsylvania
No Drawing. Filed Aug. 18, 1959, Ser. No. 834,388
3 Claims. (Cl. 23—143)

This invention relates to the production of alumina of low soda content, and more particularly relates to a method for the treatment of alumina hydrate containing a small amount of soda as an impurity to substantially reduce the soda content thereof.

In the conventional Bayer process for alumina production, alumina hydrate is precipitated from a solution of sodium aluminate. The precipitated alumina hydrate may be calcined or otherwise treated to obtain alumina which in turn has found wide application in the production of ceramics and refractory materials. However, an appreciable amount of caustic, usually referred to as soda ($Na_2O$), is occluded by the alumina during the precipitation step, and is not removed by subsequent leaching and/or calcining of the alumina at temperatures of about 1300° F. The soda impurity, which varies from about 0.2 to 1% by weight as $Na_2O$ in alumina, may be deleterious to many applications for alumina and especially reduces the electrical insulating qualities of alumina porcelains.

Considerable effort has been expended to determine a method for freeing the alumina from soda. One known commercial process proposes calcining of Bayer process alumina hydrate in the presence of boric oxide at a temperature of at least 1300° C. to volatilize the sodium borate produced by reaction of the boric oxide and sodium oxide. However, the alumina dust contaminated with sodium borate is picked up by the hot gases during calcination and carried out of the kiln. To avoid this loss of alumina values and to recover the alumina dust substantially free from sodium borate, the process has been further modified so that the dust is collected, as in a cyclone dust collector, and leached with water to dissolve out the sodium borate. The recovered alumina thus may be returned to the calcining kiln where it is mixed with the material being converted to alumina.

Although this process, as modified, has been generally satisfactory, it has been found that the volatilized sodium borate attacks the kiln lining causing its disintegration and resultant contamination of the alumina. Further, the presence of volatilized sodium borate has been found to produce alumina of large and varying median crystal size, for example from about 6 to 10 microns.

It is therefore a general object of the invention to provide an improved method of producing alumina of low soda content.

It is a more specific object of the invention to provide a method for the treatment of alumina hydrate containing a small amount of soda as an impurity whereby alumina of low soda content may be prepared.

It is a further object to provide a method of the above type which incorporates in the process a mineralizing agent to promote crystal growth and further to reduce the temperature required to carry out the treatment.

It is still another object to provide a method of producing alumina of low soda content which eliminates from the process the adverse effects of volatilized sodium borate.

It has now been found that the above objects, and others which will become evident from the description herein, can be attained by a method in which the alumina hydrate, containing a small quantity of soda as an impurity, is admixed with boric oxide, for reacting with the soda on heating, and a fluoride which acts as a mineralizing agent to promote crystal growth. The admixture is heated at a temperature sufficient to solubilize the sodium oxide, but below the effective volatilization temperature of sodium borate, and then leached to dissolve out the solubilized sodium oxide. By this treatment, alumina can be produced which contains less than about 0.08% soda and usually less than about 0.05% soda. The boric oxide may be added as boric oxide per se or as boric acid, but is preferably added as a boric acid solution so as to guarantee adequate mixing. The amount employed should ordinarily provide at least 0.05:1 molar raito of boric oxide to sodium oxide. Quantities providing a ratio below about 0.05:1 usually afford insufficient solubilizing agent while quantities providing above 1:1 result in excessive amounts of boric oxide in the leached product for most purposes.

The fluoride acts as a mineralizer promoting crystal growth, and also lowers the amount of externally generated heat that must be supplied. When the mineralizing agent is employed, it is necessary only to heat the admixture to about the mineralizing temperature, which is generally above about 900° C., at which temperature an exothermic reaction occurs that supplies heat which aids in solubilizing soda. It has been found that the fluoride reduces substantially the amount of boric oxide required. Apparently, the fluoride has some beneficial effect on the soda solubilizing reaction. When employing the fluoride mineralizer, it is desirable that a non-contaminating compound be selected such as aluminum fluoride, cryolite, ammonium fluoride, or alkali metal fluorides such as sodium fluoride, or alkaline earth metal compounds such as calcium fluoride. Of these, the aluminum fluoride is preferred, particularly in view of the fact that the alkali fluorides may increase the alkali burden to be removed.

The amount of fluoride mineralizer employed should ordinarily be at least 0.15 part fluoride per 100 parts alumina. In general, the influence of the fluoride on the initial temperature and the temperature rise as a result of the exothermic reaction varies to some extent with the concentration of the fluoride. For example, at about 1 part fluoride per 100 parts alumina, the initial temperature triggering the exothermic reaction is about 1000° C., and the rise in temperature following the reaction is about 150° C. Thus, sufficient heat is produced to raise the temperature to about 1150° C. which is sufficient to solubilize the soda content. As the amount of fluoride is decreased, this initial temperature triggering the thermal reaction rises and the change in temperature decreases. Thus, the final temperature effective for solubilizing the soda content may be as high as about 1260° C. when employing only 0.25 part fluoride per 100 parts alumina. However, under the relatively rapid speed of the thermal reaction, which generally occurs in 3 to 4 minutes, there is no substantial volatility of the boric oxide or sodium borate. It thus will be observed that ordinarily a smaller proportion than 0.15 part fluoride may result in undesirable volatilization. On the other hand, quantities of fluoride above about 2 parts result in no further advantage in lowering the temperature at which triggering of the thermal reaction occurs. Moreover, employing a high concentration of fluoride may result in an excessive amount of residual fluorine in the product.

Volatilization of the sodium borate is insignificant until temperatures of 1270° C. and above are reached, 1300° C. being considered the effective volatilization temperature. There is some tendency for the boric oxide to volatilize at the higher temperatures but this may be disregarded within the operative temperature range of this invention. Premature volatilization of the boric oxide and sodium borate is minimized by intimate mixing of the boric oxide and alumina hydrate and further ensures adequate contact between the reactants. Partial precalcination of the alumina prior to the addition of the boric oxide also favors intimate mixing of the reactants.

The leaching medium may be any which will dissolve the sodium borate and excess boric oxide and fluoride from the calcined product. From the standpoint of cost and ease of handling, water is considered to be most desirable, although other solvents might conceivably be employed if there is no contaminating effect. The water employed is desirably free from various contaminating salts and may be deionized, distilled, or otherwise suitably treated. Because the alumina hydrate has been converted substantially to α-alumina by the elevated temperatures of the process, the hydrating effect of the water is minimal and may be disregarded. Exemplary of the present invention are the data contained in the table. Samples of Bayer process alumina hydrate containing about 0.43 percent by weight of sodium oxide were admixed with boric acid and aluminum fluoride in the proportions indicated. The admixture was heated to solubilize the soda and leached with boiling water, decanted, and again leached with water and decanted. Distilled water was employed in these tests.

*Table 1*

| Additives | | Heating Temp., ° C. | | Analysis of Alumina After Water Leaching | | | |
|---|---|---|---|---|---|---|---|
| $Al_2F_6$ parts per 100 parts alumina | Molar Ratio $B_2O_3/Na_2O$ | Initial | Final | $Na_2O$ | $B_2O_3$ | F | Median crystal size, microns |
| 2 | 1:1 | 930 | 1,092 | 0.02 | 0.06 | 0.15 | 3.5 |
| 1 | 1:1 | 996 | 1,135 | 0.019 | 0.035 | 0.21 | 3.5 |
| 1 | 0.25:1 | 1,032 | 1,144 | 0.021 | 0.008 | 0.12 | 4.0 |
| 1 | 0.1:1 | 1,032 | 1,176 | 0.032 | 0.004 | 0.11 | 3.0 |
| 0.5 | 0.5:1 | 1,085 | 1,203 | 0.029 | 0.010 | 0.11 | 3.5 |
| 0.25 | 1:1 | 1,132 | 1,232 | 0.02 | 0.022 | 0.0037 | 2.5 |
| 0.25 | 0.5:1 | 1,168 | 1,262 | 0.046 | 0.012 | 0.011 | 3.5 |

The process yields a product of consistently high purity and small median crystal size. The lower temperatures and abbreviated heating periods required in this invention result in a considerable fuel saving over those heretofore employed. Additionally, the process eliminates the requirement of dust-collector washing and affords the potentiality of recovering the boron values in a reusable form as well as substantially eliminating the highly corrosive effect of volatilized sodium borate on the kiln linings.

Although the alumina hydrate for the present process, in general, is the hydrous precipitate obtained by the Bayer process as described above, it should be understood that the process is equally applicable to, and is intended to include, aluminum oxide or hydrates thereof, including those compounds which decompose during heating to yield alumina or alumina hydrate, such as the carbonated aluminas. Hydrated aluminum oxide, or alumina hydrate, is intended to embrace not only those compounds where water is present in definite proportions, such as the monohydrate or trihydrate form, but also the gelatinous form where the water is not present in a definite ratio.

Having thus described my invention, I claim:

1. A method of removing soda from an aluminum compound containing soda and selected from the group consisting of alumina and alumina hydrate, comprising admixing with said aluminum compound boric oxide and a fluoride mineralizer, heating said admixture at a temperature above 900° C. but below the effective volatilization temperature of sodium borate to solubilize the sodium oxide contained in said compound, and subsequently leaching the heated admixture with a solvent for sodium borate.

2. A method of removing soda from an aluminum compound containing soda and selected from the group consisting of alumina and alumina hydrate, comprising admixing with said aluminum compound an amount of boric oxide sufficient to provide at least 0.05 mole per mole of sodium oxide contained in said aluminum compound, and from about 0.15 to 2 parts of a fluoride mineralizer per 100 parts aluminum compound, heating said admixture at a temperature above 900° C. but below the effective volatilization temperature of sodium borate to solubilize the sodium oxide contained in said aluminum compound, and subsequently leaching the heated admixture with a solvent for sodium borate.

3. The method according to claim 2 wherein the said fluoride is aluminum fluoride.

References Cited in the file of this patent

UNITED STATES PATENTS

| | | |
|---|---|---|
| 1,950,883 | Gitzen | Mar. 13, 1934 |
| 2,069,060 | Fessler | Jan. 26, 1937 |
| 2,411,806 | Riesmeyer | Nov. 26, 1946 |
| 2,411,807 | Riesmeyer | Nov. 26, 1946 |
| 2,469,088 | Thompson | May 3, 1949 |
| 2,769,688 | Milliken et al. | Nov. 6, 1956 |
| 2,774,744 | Barrett et al. | Dec. 18, 1956 |
| 2,833,622 | Roberts et al. | May 6, 1958 |
| 2,887,361 | Fenerty | May 19, 1959 |
| 2,961,297 | Fenerty | Nov. 22, 1960 |